(12) United States Patent
Montagna

(10) Patent No.: US 11,808,323 B2
(45) Date of Patent: Nov. 7, 2023

(54) OPEN BLEED-BASE VALVE

(71) Applicant: DRiV Automotive Inc., Lake Forest, IL (US)

(72) Inventor: Franky Montagna, Bilzen (BE)

(73) Assignee: DRiV Automotive Inc., Northville, MI (US)

(*) Notice: Subject to any disclaimer, the term of this patent is extended or adjusted under 35 U.S.C. 154(b) by 152 days.

(21) Appl. No.: 17/175,972

(22) Filed: Feb. 15, 2021

(65) Prior Publication Data
US 2022/0260129 A1 Aug. 18, 2022

(51) Int. Cl.
*F16F 9/512* (2006.01)
*F16F 9/32* (2006.01)
(Continued)

(52) U.S. Cl.
CPC ............ *F16F 9/512* (2013.01); *F16F 9/185* (2013.01); *F16F 9/3242* (2013.01); *F16F 9/348* (2013.01);
(Continued)

(58) Field of Classification Search
CPC .......... F16F 9/512; F16F 9/185; F16F 9/3242; F16F 9/348; F16F 2222/12;
(Continued)

(56) References Cited

U.S. PATENT DOCUMENTS 2,902,274 A * 9/1959 McIntyre ............. B60G 15/063
267/221
4,076,276 A * 2/1978 Wijnhoven ............. F16F 9/348
188/315
(Continued)

FOREIGN PATENT DOCUMENTS

CN 103256335 B 7/2015
GB 2440014 B 5/2008
(Continued)

OTHER PUBLICATIONS

Notification of Transmittal of International Search Report and Written Opinion of the International Searching Authority regarding PCT/US2022/015907 dated May 27, 2022 (14 pages).

*Primary Examiner* — Robert A. Siconolfi
*Assistant Examiner* — James K Hsiao
(74) *Attorney, Agent, or Firm* — DRiV Automotive Inc.

(57) ABSTRACT

A damper assembly includes a pressure tube defining a first chamber and a piston movable within the first chamber. The damper assembly includes a reserve tube defining a second chamber. The damper assembly includes a cylinder end attached to the pressure tube, the cylinder end defining a passage in fluid communication with the first chamber and the second chamber. The damper assembly includes an orifice disc attached to the cylinder end and defining an opening in fluid communication with the passage. The damper assembly includes a check disc attached to the cylinder end, the check disc movable from a first position spaced from orifice disc to a second position abutting the orifice disc. Movement of the piston within the first chamber causes fluid flow between the first chamber and the second chamber via the passage of the cylinder end. The check disc and the orifice disc limit a rate of such fluid flow.

18 Claims, 13 Drawing Sheets

(51) Int. Cl.
*F16F 9/18* (2006.01)
*B60G 13/08* (2006.01)
*B60G 17/08* (2006.01)
*F16F 9/348* (2006.01)
*F16K 15/02* (2006.01)

(52) U.S. Cl.
CPC ............ *F16K 15/028* (2013.01); *B60G 13/08* (2013.01); *B60G 17/08* (2013.01); *B60G 2202/24* (2013.01); *B60G 2204/62* (2013.01); *B60G 2206/41* (2013.01); *B60G 2206/70* (2013.01); *B60G 2500/112* (2013.01); *B60G 2600/21* (2013.01); *B60G 2800/162* (2013.01); *F16F 2222/12* (2013.01); *F16F 2224/0208* (2013.01); *F16F 2228/066* (2013.01); *F16F 2230/183* (2013.01); *F16F 2232/08* (2013.01); *F16F 2234/02* (2013.01)

(58) Field of Classification Search
CPC .......... F16F 2228/066; F16F 2230/183; F16F 2232/08; F16F 2234/02; B60G 13/08; B60G 17/08; B60G 2202/24; B60G 2204/62; B60G 2206/41; B60G 2206/70; B60G 2500/112; B60G 2600/21; B60G 2800/162; F16K 15/028
See application file for complete search history.

(56) References Cited

U.S. PATENT DOCUMENTS

| | | | | |
|---|---|---|---|---|
| 4,602,707 A * | 7/1986 | Zumwinkel | ............... | F16F 9/34 188/315 |
| 4,782,925 A * | 11/1988 | Grundei | ................ | F16F 9/585 188/315 |
| 5,042,624 A * | 8/1991 | Furuya | .................. | F16F 9/348 188/322.22 |
| 5,316,113 A * | 5/1994 | Yamaoka | ............. | F16F 9/3484 188/320 |
| 8,083,039 B2 | 12/2011 | Vanbrabant | | |
| 8,297,418 B2 | 10/2012 | Bombrys et al. | | |
| 9,080,629 B2 | 7/2015 | Oukhedou et al. | | |
| 9,249,854 B2 * | 2/2016 | Kim | ....................... | F16F 9/3485 |
| 9,347,512 B2 * | 5/2016 | Yamada | ................. | F16F 9/3484 |
| 9,410,595 B2 * | 8/2016 | Yamada | ................. | F16F 9/3481 |
| 9,611,912 B2 * | 4/2017 | Kim | ....................... | F16F 9/3482 |
| 9,638,280 B2 * | 5/2017 | Nowaczyk | ............. | F16F 9/348 |
| 9,739,330 B2 | 8/2017 | Reybrouck et al. | | |
| 9,739,332 B2 * | 8/2017 | Kim | ....................... | F16F 9/5126 |
| 9,797,466 B2 * | 10/2017 | Kim | ....................... | F16F 9/3415 |
| 9,845,839 B2 * | 12/2017 | Rummel | ................. | F16F 9/18 |
| 10,233,995 B2 * | 3/2019 | Kim | ....................... | F16F 9/3214 |
| 10,258,146 B2 * | 4/2019 | Hansen | .................. | A47B 9/10 |
| 10,995,813 B2 * | 5/2021 | Yamashita | ............. | F16F 9/32 |
| 11,187,486 B2 * | 11/2021 | Bauer | ..................... | F41A 25/02 |
| 2005/0056505 A1 * | 3/2005 | Deferme | ............... | F16F 9/3485 188/283 |
| 2005/0279597 A1 * | 12/2005 | Yamaguchi | ............. | F16F 9/348 188/322.13 |
| 2006/0283676 A1 * | 12/2006 | Deferme | ............... | F16F 9/3485 188/322.15 |
| 2007/0034466 A1 * | 2/2007 | Paesmans | ............... | B60G 17/08 188/322.22 |
| 2008/0185245 A1 * | 8/2008 | Park | ....................... | F16F 9/465 188/322.15 |
| 2008/0185246 A1 * | 8/2008 | Park | ....................... | F16F 9/3485 188/322.15 |
| 2011/0290603 A1 * | 12/2011 | Yabe | ........................ | F16F 9/46 188/282.1 |
| 2012/0097493 A1 | 4/2012 | Ewers | | |
| 2013/0037361 A1 * | 2/2013 | Park | ....................... | F16F 9/3481 188/322.15 |
| 2013/0146408 A1 * | 6/2013 | Lee | ........................... | F16F 9/38 188/322.17 |
| 2013/0234378 A1 * | 9/2013 | Ericksen | ................ | B60G 13/06 267/221 |
| 2013/0333993 A1 * | 12/2013 | Yu | ........................ | F16F 9/3214 188/322.22 |
| 2014/0048366 A1 * | 2/2014 | Lee | ....................... | F16F 9/5126 188/322.15 |
| 2014/0231199 A1 * | 8/2014 | Kim | ....................... | F16F 9/34 188/313 |
| 2014/0262655 A1 * | 9/2014 | Tuts | ....................... | F16F 9/512 188/322.15 |
| 2014/0332332 A1 * | 11/2014 | Lawler | .................. | F16F 9/3484 188/313 |
| 2015/0041269 A1 * | 2/2015 | Lim | ....................... | F16F 9/5126 188/322.15 |
| 2015/0114774 A1 * | 4/2015 | Kim | ..................... | F16F 9/3485 188/322.15 |
| 2015/0204410 A1 * | 7/2015 | Flacht | ................... | F16F 9/5126 188/313 |
| 2015/0337918 A1 * | 11/2015 | Rummel | ................. | B60G 13/08 188/315 |
| 2016/0017952 A1 * | 1/2016 | Kim | ....................... | F16F 9/512 188/322.13 |
| 2016/0146286 A1 * | 5/2016 | Rummel | ................. | F16F 9/3484 188/313 |
| 2016/0201752 A1 * | 7/2016 | Kim | ....................... | F16F 9/3415 188/280 |
| 2016/0356335 A1 * | 12/2016 | Nomura | ................. | F16F 9/19 |
| 2017/0082169 A1 * | 3/2017 | Kim | ....................... | F16F 9/3488 |
| 2017/0241502 A1 * | 8/2017 | Rummel | ................. | F16F 9/348 |
| 2022/0196106 A1 * | 6/2022 | Wimmer | ................. | F16F 9/369 |

FOREIGN PATENT DOCUMENTS

| | | |
|---|---|---|
| JP | H0285531 A | 3/1990 |
| KR | 20080040268 A | 5/2008 |

* cited by examiner

OPEN BLEED-BASE VALVE

BACKGROUND

Dampers are typically used in conjunction with automotive suspension systems or other suspension systems to control movement of wheels of a vehicle relative to a body of the vehicle. In order to control movement, dampers are generally connected between the sprung (body) and the unsprung (suspension/drivetrain) masses of the vehicle. Each damper controls movement of respective wheels by limiting fluid flow into, out of, and/or between working chambers of the dampener. Fluid movement is caused by a movement of a piston within a pressure tube of the dampener, e.g., when the damper is moved toward a compressed or extended position.

DETAILED DESCRIPTION

A damper assembly for controlling movement of a wheel of a vehicle includes a cylinder end assembly that controls fluid flow between fluid chambers of the damper assembly. The damper assembly includes a pressure tube defining a first chamber and a piston movable within the first chamber. The damper assembly includes a reserve tube defining a second chamber. The cylinder end assembly includes a cylinder end attached to the pressure tube, the cylinder end defining a passage in fluid communication with the first chamber and the second chamber. The cylinder end assembly includes an orifice disc attached to the cylinder end and defining an opening in fluid communication with the passage. The cylinder end assembly includes a check disc attached to the cylinder end, the check disc movable from a first position spaced from orifice disc to a second position abutting the orifice disc.

The damper assembly provides variable and tunable resistance and may be configured to provide a desired responsive force that is resistant to movement of the damper assembly depending on a speed and direction of the movement, e.g., toward an extended or compressed position. For example, movement of the piston within the first chamber may cause fluid flow between the first chamber and the second chamber via the passage of the cylinder end. The check disc and the orifice disc limit a rate of such fluid flow by condoling a size an opening defined therebetween through which fluid may flow. Such fluid flow may flex the check disc toward the orifice disc, decreasing the size of the opening and reducing amount of fluid that may flow therethrough.

Figure 1:
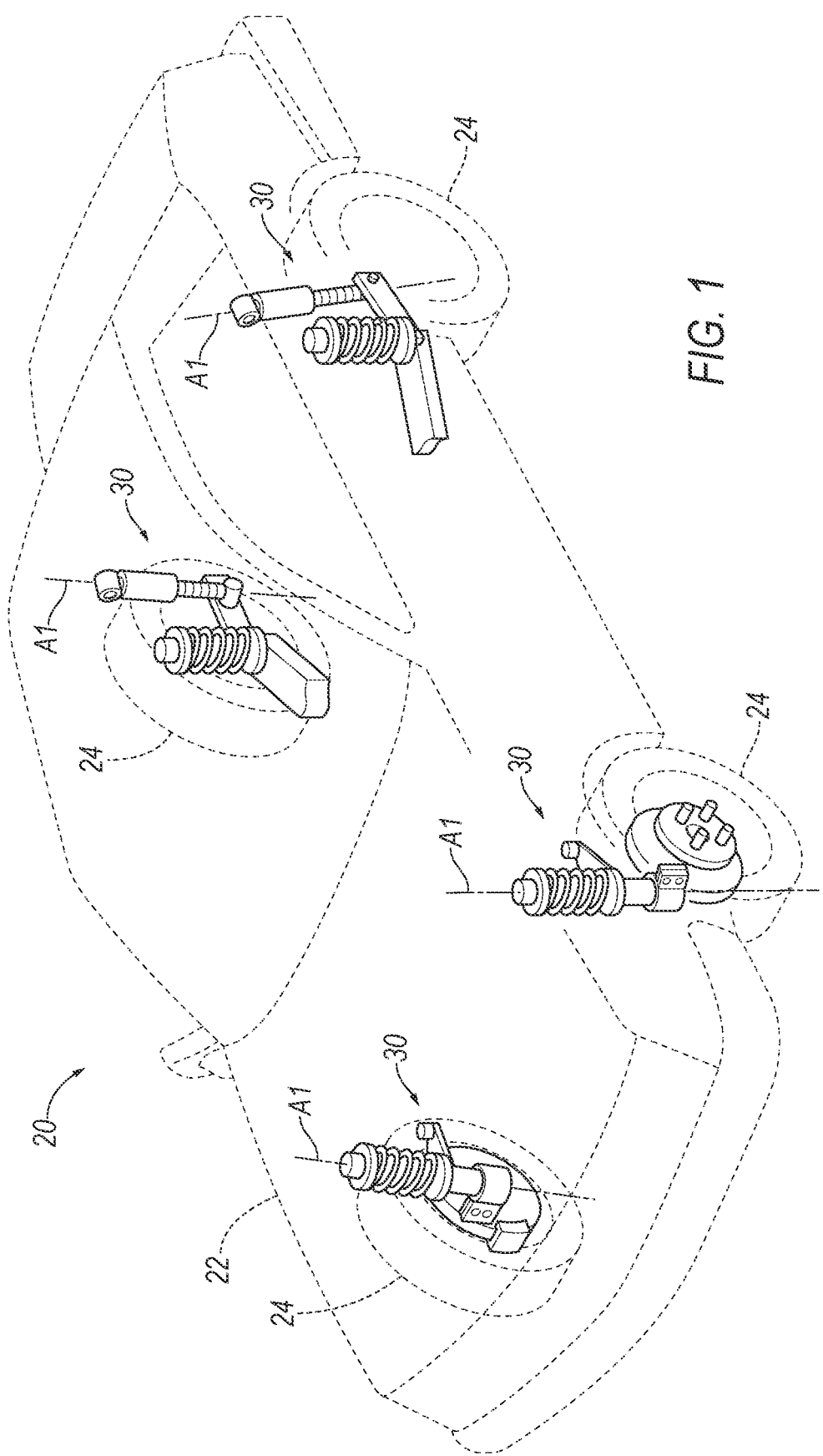
FIG. 1 is a perspective view of a vehicle having a plurality of damper assemblies.

With reference to FIG. 1, an exemplary vehicle 20 includes a plurality of exemplary damper assemblies 30. The vehicle 20 may be any suitable type of wheeled transport, e.g., a passenger or commercial automobile such as a sedan, a coupe, a truck, a sport utility vehicle, a crossover vehicle, a van, a minivan, a taxi, a bus, a motorcycle, etc. The vehicle 20, for example, may be an autonomous vehicle. In other words, the vehicle 20 may be autonomously operated such that the vehicle 20 may be driven without constant attention from a driver, i.e., the vehicle 20 may be self-driving without human input.

The vehicle 20 includes a body 22 and a frame. The body 22 and frame may be of a unibody construction. In the unibody construction, the body 22, e.g., rockers, serves as the vehicle frame, and the body 22 (including the rockers, pillars, roof rails, etc.) is unitary, i.e., a continuous one-piece unit. As another example, the body 22 and frame may have a body-on-frame construction (also referred to as a cab-on-frame construction). In other words, the body 22 and frame are separate components, i.e., are modular, and the body 22 is supported on and affixed to the frame. Alternatively, the body 22 and frame may have any suitable construction. The body 22 and/or the frame may be formed of any suitable material, for example, steel, aluminum, etc. The vehicle 20 includes wheels 24 that control motion of the vehicle 20 relative to ground supporting the vehicle 20, e.g., acceleration, declaration, turning, etc. Vertical movement of the wheels 24 relative to the body 22 affects an amount of traction between the wheels 24 and the ground and an amount of vertical acceleration of the body 22 experienced by occupants of the vehicle 20 when the vehicle 20 travels over bumps and the like, e.g., the ride feel experienced by the occupants.

The damper assemblies 30 are typically used in conjunction with automotive suspension systems or other suspension systems to control movement of the wheels 24 of the vehicle 20 relative to the body 22 of the vehicle 20. In order to control movement, damper assemblies 30 are generally connected between the sprung (e.g., the body 22) and the unsprung (e.g., suspension/drivetrain components) masses of the vehicle 20.

Figure 2:
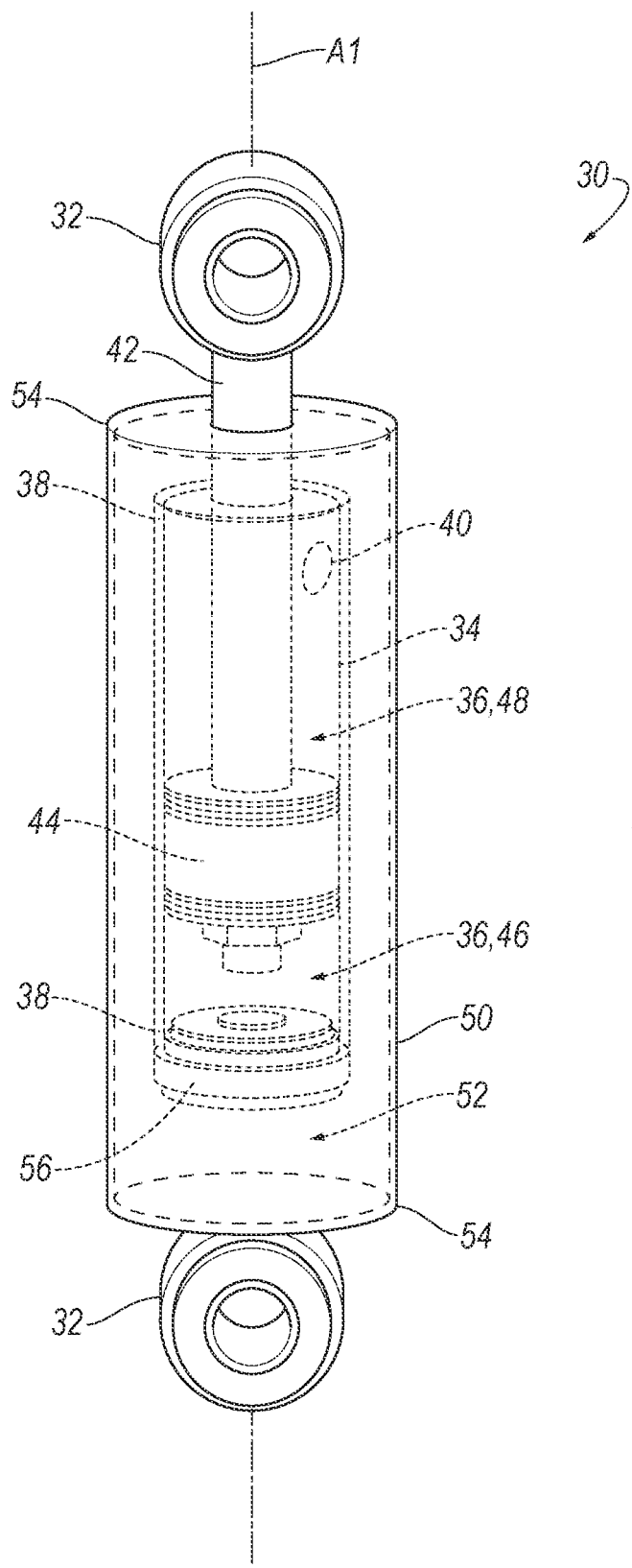
FIG. 2 is a perspective view of one of the damper assemblies.

With reference to FIG. 2, the damper assembly 30 is movable from a compressed position to an extended position, and vice versa. A distance between ends 32 of the damper assembly 30 is less in the compressed position than in the extended position. Springs or the like may urge the damper assemblies 30 toward the extended position. Force applied to wheels 24 of the vehicle 20, e.g., from bumps, potholes, etc., may urge to damper assemblies 30 toward the compressed position.

The damper assembly 30 defines an axis A1. The axis A1 extends between the ends 32 of the damper assembly 30. The damper assembly 30 may be elongated along the axis A1. The terms "axially," "radially," and "circumferentially" used herein are relative to the axis A1 defined by the damper assembly 30.

The damper assembly 30 includes a pressure tube 34 that defines a first chamber 36. For example, the pressure tube 34 may be hollow and tubular, enclosing the first chamber 36 therein. The first chamber 36 is surrounded by the pressure tube 34. Axially spaced ends 38 of the pressure tube 34 may further define the first chamber 36. The first chamber 36 is filled with fluid, e.g., an incompressible hydraulic fluid. Movement of the damper assembly 30, e.g., to the extended or compressed position, may increase and/or decrease fluid pressure in the pressure tube 34. The pressure tube 34 may be elongated along the axis A1 of the damper assembly 30. The pressure tube 34 may define an opening 40 that permits fluid flow into and/or out of the first chamber 36. The opening 40 may extend radially from an inner surface of the pressure tube 34 to an outer surface of the pressure tube 34. The opening 40 may be axially between, and spaced from, the ends 38 of the pressure tube 34. The pressure tube 34 may be metal, or any suitable material.

The damper assembly 30 includes a rod 42 extending away from, and movable relative to, the pressure tube 34. The rod 42 may be elongated along the axis A1 of the damper assembly 30. The rod 42 is moved relative to the pressure tube 34 when the damper assembly 30 is moved toward the compressed position or the extended position. The rod 42 may extend from within the first chamber 36 of the pressure tube 34 to outside the first chamber 36.

The damper assembly 30 includes a piston 44 that divides the first chamber 36 of the pressure tube 34 into a compression sub-chamber 46 and a rebound sub-chamber 48, i.e., with the compression sub-chamber 46 on one side of the piston 44 and the rebound sub-chamber 48 on the opposite side of the piston 44 along the axis A1. The piston 44 is movable within the pressure tube 34 along the axis A1. The piston 44 may be attached to the rod 42, such that the piston 44 and rod 42 move concurrently when the damper assembly 30 is moved toward the compressed position or the extended position. An outer circumferential surface of the piston 44 may be sealed to the inner surface of the pressure tube 34. The piston 44 may include one or more passages than enable fluid flow between the compression sub-chamber 46 and the rebound sub-chamber 48. One or more discs may be attached to the piston 44 to control fluid flow through such passages.

Sliding the piston 44 along the axis A1 varies volumes of the compression sub-chamber 46 and the rebound sub-chamber 48. For example, a volume of the compression sub-chamber 46 may decrease, and a volume of the rebound sub-chamber 48 may increase, when the damper assembly 30 is moved toward the compressed position. As another example, the volume of the rebound sub-chamber 48 may decrease, and the volume of the compression sub-chamber 46 may increase, when the damper assembly 30 is moved toward the compressed position. Changing the volume of the compression sub-chamber 46 and the rebound sub-chamber 48 may cause fluid to flow between the first chamber 36 and a second chamber 52 (described below), e.g., between the compression sub-chamber 46 and the second chamber 52 via passages 68, 70, 72 of a cylinder end 58, and between the rebound sub-chamber 48 and the second chamber 52 via the opening 40 of the pressure tube 34. Changing the volume of the compression sub-chamber 46 and the rebound sub-chamber 48 may cause fluid to flow between the compression sub-chamber 46 and the rebound sub-chamber 48, e.g., via passages of the piston 44.

The damper assembly 30 includes a reserve tube 50. The reserve tube 50 extends about the pressure tube 34, e.g., circumferentially surrounding the pressure tube 34. The reserve tube 50 may be elongated along the axis A1 of the damper assembly 30. The reserve tube 50 may be metal, or any suitable material.

The reserve tube 50 defines the second chamber 52. For example, the pressure tube 34 may be hollow and tubular, enclosing the second chamber 52 therein. The second chamber 52 may be between the pressure tube 34 and the reserve tube 50, e.g., the pressure tube 34 may separate the first chamber 36 from the second chamber 52. Axially spaced ends 54 of the reserve tube 50 may further define the second chamber 52. Fluid may flow from the first chamber 36 to the second chamber 52 (and/or vice versa), e.g., at one of the ends 38 of the pressure tube 34 and/or the opening 40 of the pressure tube 34.

Figure 3:
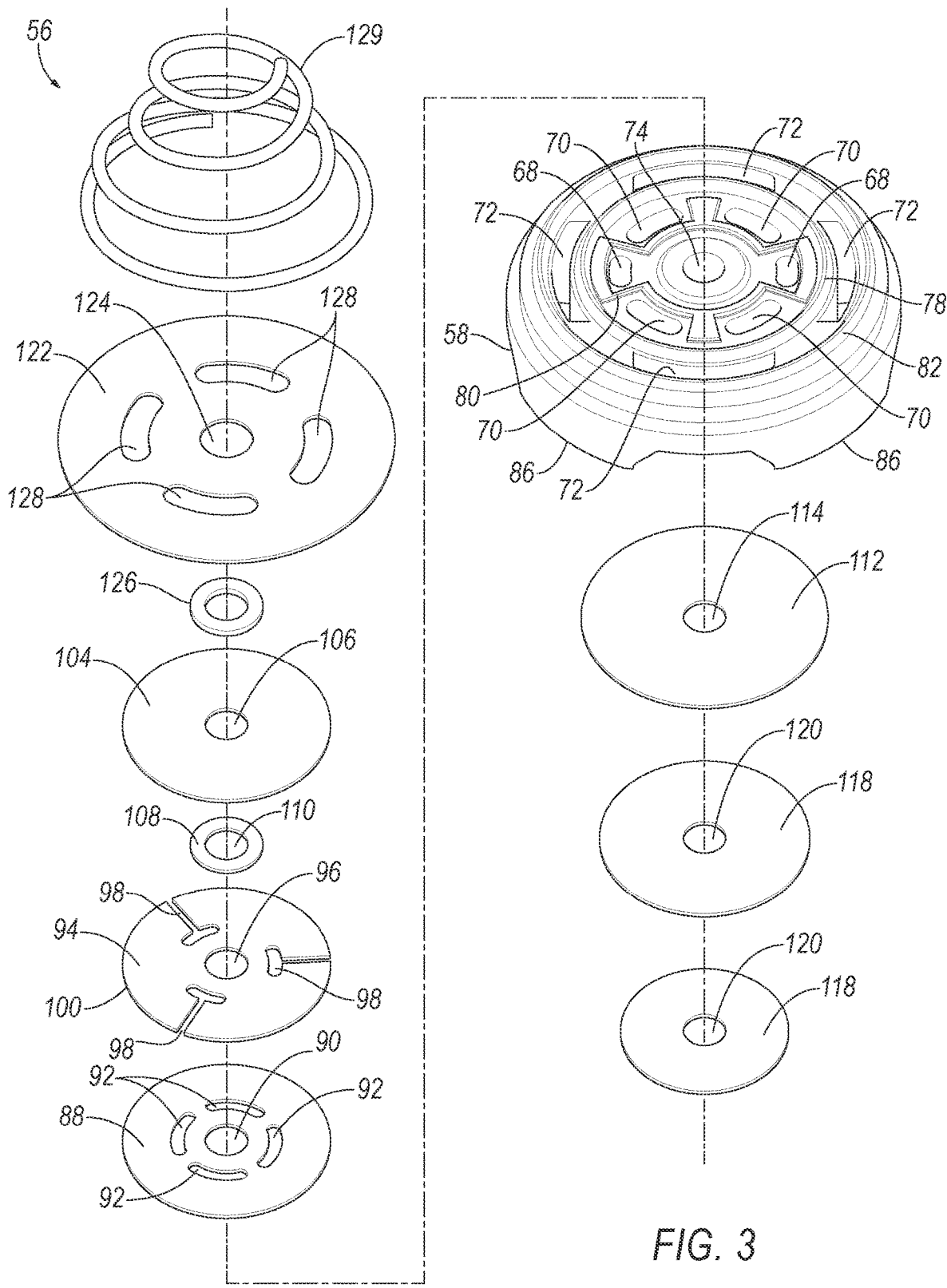
FIG. 3 is an exploded view of a cylinder end assembly of the damper assembly.

With reference to FIG. 3, the damper assembly 30 includes a cylinder end assembly 56. The cylinder end assembly 56 controls fluid flow between the first chamber 36 and the second chamber 52 at one of the ends 38 of the pressure tube 34.

Figure 4:
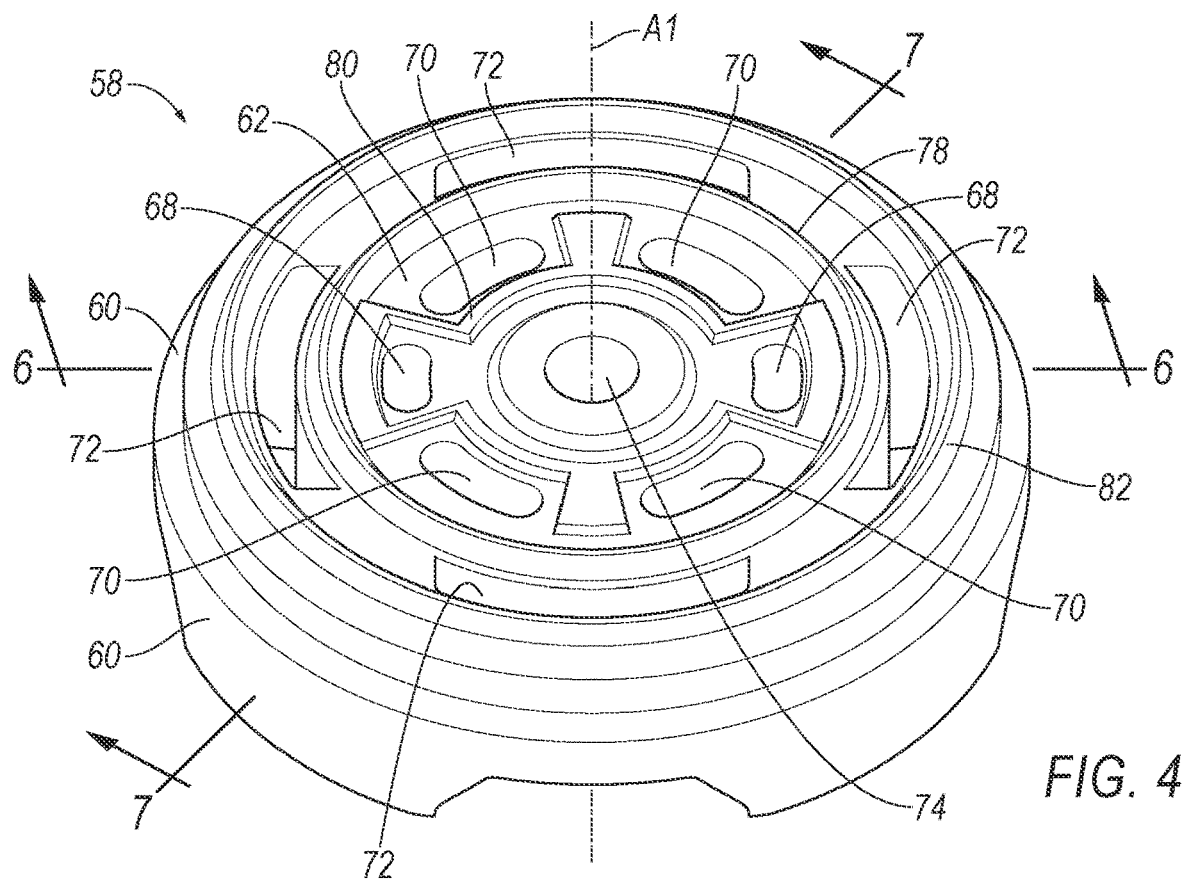
FIG. 4 is a top perspective view of a cylinder end of the cylinder end assembly.
Figure 5:
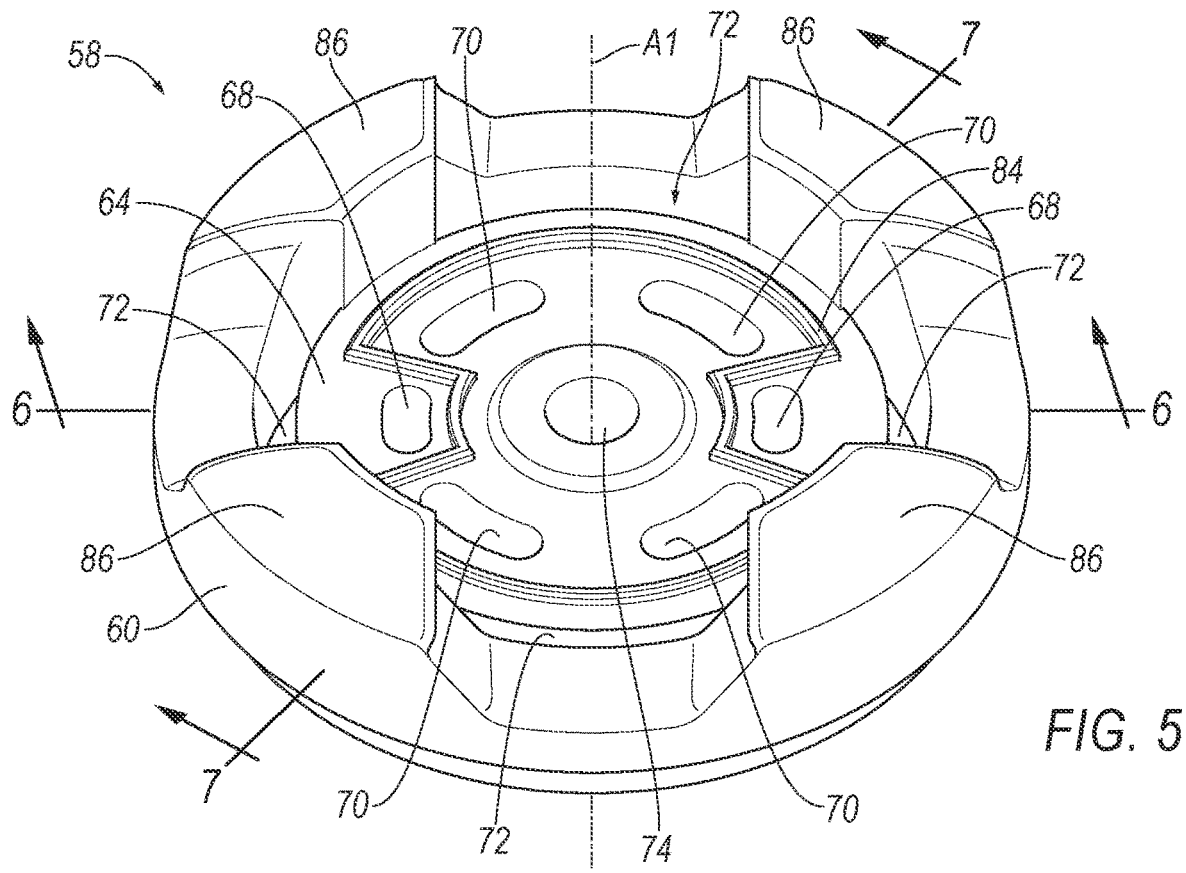
FIG. 5 is a bottom perspective view of the cylinder end of the cylinder end assembly.

The cylinder end assembly 56 includes a cylinder end 58. The cylinder end 58 encloses the first chamber 36. The cylinder end 58 separates the first chamber 36 from the second chamber 52. The cylinder end 58 is attached to the pressure tube 34, e.g., at one of the ends 38. The cylinder end 58 may be attached to the pressure tube 34 via friction fit, weld, fasteners, etc. For example, the cylinder end 58 may include a generally cylindrical outer surface 60 that extends between a top surface 62 and a bottom surface 64 of the cylinder end 58. The outer surface 60 may include a step 66 that mates with the pressure tube 34. The top surface 62 of the cylinder end 58, e.g., shown in FIG. 4, and the bottom surface 64 of the cylinder end 58, e.g., shown in FIG. 5, may extend generally perpendicular to the axis A1. The top surface 62 may face the first chamber 36. The bottom surface 64 is opposite the top surface 62, e.g., the bottom surface 64 may face away from the first chamber 36. The cylinder end 58 may be metal, or any suitable material.

The cylinder end 58 defines one or more passages, e.g., first passages 68, second passages 70, and third passages 72. The passages 68, 70, 72 are in fluid communication with the first chamber 36 and the second chamber 52 passages, i.e., such that fluid may flow from the first chamber 36 to the second chamber 52 (and/or vice versa) via the passages 68, 70, 72. For example, the passages 68, 70, 72 may extend from the top surface 62 of the cylinder end 58 to the bottom surface 64 of the cylinder end 58.

The cylinder end 58 may define a center opening 74. The center opening 74 may extend through the cylinder end 58, e.g., from the top surface 62 to the bottom surface 64. A fastener 76 or the like may be disposed in the center opening 74, attaching various other components of the cylinder end assembly 56 to the cylinder end 58.

The cylinder end 58 may include a first rib 78 extending axially away from the top surface 62 of the cylinder end 58 toward the first chamber 36. The first rib 78 may circumferentially surround the first passages 68 and the second passages 70. For example, the first passages 68 and the second passages 70 may be radially between the center opening 74 of the cylinder end 58 and the first rib 78.

The cylinder end 58 may include a second rib 80 extending axially away from the top surface 62 toward the first chamber 36. The second rib 80 may be shorted than the first rib 78, i.e., the first rib 78 may axially extend from the top surface 62 beyond the second rib 80. The second rib 80 may separate the first passages 68 from the second passages 70. For example, the second rib 80 may surround the first passages 68 and not the second passages 70. The second rib 80 may be radially between the first rib 78 and the first passages 68, e.g., with the first passages 68 between the second rib 80 and the center opening 74. The second passages 70 may be radially between the first rib 78 and the second rib 80, e.g., with second rib 80 radially between the second passages 70 and the center opening 74.

The cylinder end 58 may include a third rib 82 extending axially away from the top surface 62 toward the first chamber 36. The third rib 82 may circumferentially surround the first rib 78. The third passages 72 may be radially between the first rib 78 and the third rib 82. For example, the first rib 78 may be radially inward (e.g., toward the center opening 74) of the third passages 72 and the third rib 82 may be radially outward (e.g., away from the center opening 74) of the third passages 72. The first rib 78 and the third rib 82 may be equal in height, i.e., the first rib 78 may axially extend from the top surface 62 as far as the third rib 82.

The cylinder end 58 may include a fourth rib 84 extending axially away from the bottom surface 64 and away from the first chamber 36. The fourth rib 84 may be radially inward of the first passages 68 and radially outward of the second passages 70, e.g., with the fourth rib 84 between the first passages 68 and the center opening 74, and the second passages 70 between the fourth rib 84 and the center opening 74.

The cylinder end 58 may include a plurality of merlons 86 extending axially away from the bottom surface 64 and away from the first chamber 36. The merlons 86 may be radially outward of the fourth rib 84. The merlons 86 may be circumferentially spaced about an outer edge of the of bottom surface 64.

The cylinder end assembly 56 may include a seat disc 88. The seat disc 88 is attached to the cylinder end 58, e.g., at the top surface 62. For example, the fastener 76 disposed in the center opening 74 of the cylinder end 58 may also be disposed in a center opening 90 of the seat disc 88. The seat disc 88 may abut the top surface 62 of the cylinder end 58. For example, the seat disc 88 may abut the second rib 80.

The seat disc 88 defines one or more openings 92. The openings 92 permit axial flow of fluid from one side of the seat disc 88 to an opposite side of the seat disc 88. The openings 92 of the seat disc 88 are in fluid communication with the first passages 68 of the cylinder end 58, i.e., such that fluid may flow from the openings 92 of the seat disc 88 to the first passages 68, and/or vice versa. The openings 92 may be circumferentially elongated and spaced from each other about the axis A1. The openings 92 may be generally aligned with the first passages 68, e.g., such that the openings 92 overlap the first passages 68.

The cylinder end assembly 56 includes an orifice disc 94. The orifice disc 94 is attached to the cylinder end 58, e.g., at the top surface 62. For example, the fastener 76 disposed in the center opening 74 of the cylinder end 58 may also be disposed in a center opening 96 of the orifice disc 94. The orifice disc 94 may abut the seat disc 88, e.g., with the seat disc 88 axially sandwiched between the orifice disc 94 and the top surface 62 of the cylinder end 58.

The orifice disc 94 defines one or more openings 98. The openings 98 permit fluid flow axially and/or radially relative to the axis A1 of the damper assembly 30. For example, each opening 98 may be open in a radial direction and may extend radially inward from an outer edge 100 of orifice disc 94, e.g., such that fluid may flow radially into the opening 98 at the outer edge 100. The opening 98 may be T-shaped, e.g., with a bottom of the T-shape at the outer edge 100 and a top of the T-shape spaced from and radially inward of the outer edge 100.

The openings 98 of the orifice disc 94 may be in fluid communication with the openings 92 of the seat disc 88, i.e., such that fluid may flow from openings 98 of the orifice disc 94 to the openings 92 of the seat disc 88, and/or vice versa. For example, the top of the T-shape of the openings 98 of the orifice disc 94 may be generally aligned with the openings 92 of the seat disc 88, e.g., such that the openings 92, 98 overlap each other.

The openings 98 of the orifice disc 94 are in fluid communication with the first passages 68, i.e., such that fluid may flow from openings 98 of the orifice disc 94 to the first passages 68, and/or vice versa. For example, the opening 98 may radially extend from the outer edge 100 to the first passages 68. The top of the T-shape of the opening 98 may be generally aligned with the first passages 68, e.g., such that the top of the T-shape overlaps the first passages 68.

The orifice disc 94 limits a rate of fluid flow through the first passages 68. For example, the openings 98 of the orifice disc 94 may a maintain minimum size to an opening 102 between the seat disc 88 and a check disc 104 of the cylinder end assembly 56. For example, the minimum size of the opening 102 between the seat disc 88 and the check disc 104 may be equal to a radial flow area of the opening 98 of the orifice disc 94 at the outer edge 100.

The check disc 104 of the cylinder end assembly 56 is attached to the cylinder end 58, e.g., at the top surface 62. For example, the fastener 76 disposed in the center opening 74 of the cylinder end 58 may also be disposed in a center opening 106 of the check disc 104. The first rib 78 may circumferentially surround the check disc 104 about the axis A1. The first rib 78 and/or the third rib 82 may extend away from the bottom surface 64 toward the first chamber 36 beyond the check disc 104.

The check disc 104 selectively limits a rate of fluid flow through the first passages 68, e.g., in a first direction D1 that is from the first chamber 36 to the second chamber 52. The check disc 104 selectively limits a rate of fluid flow depending on a direction and an amount of fluid pressure and/or speed of fluid flow applied to the check disc 104. The check disc 104 may increase a resistance to movement in response to fluid flow past the check disc 104 and/or a difference in fluid pressure on one side of the check disc 104 relative to an opposite side. The fluid flow and/or difference in fluid pressure may translate or flex the check disc 104 to decease a size of the opening 102 between the check disc 104 and the seat disc 88 through which fluid may flow, thereby increasing resistance to movement.

Figure 6:
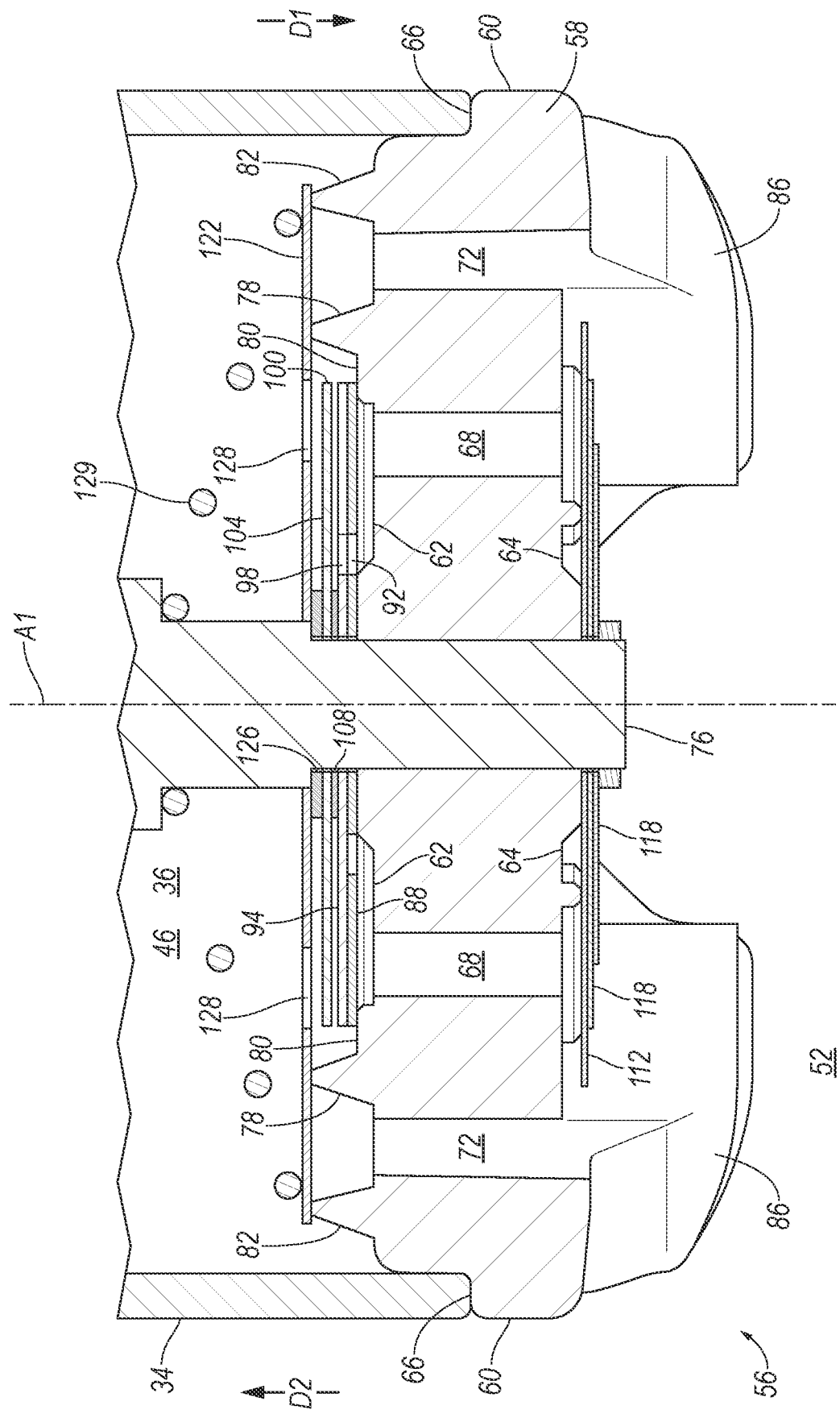
FIG. 6 is a cross-section of a portion of the damper assembly taken along line 6-6 of FIGS. 4 and 5.
Figure 8:
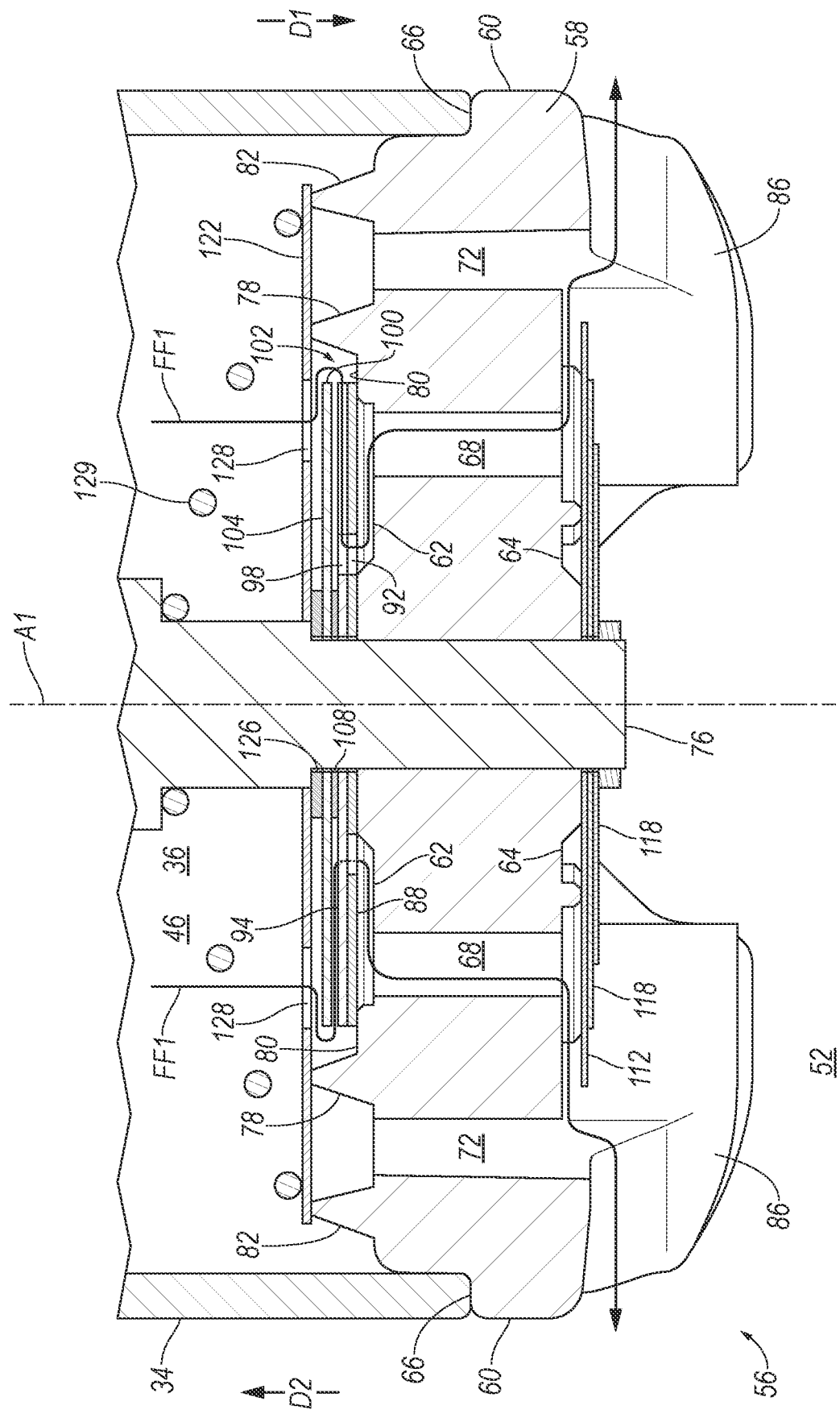
FIG. 8 is the cross section of FIG. 6 and illustrating a first fluid flow path when the damper assembly is moved toward a compressed position.
Figure 10:
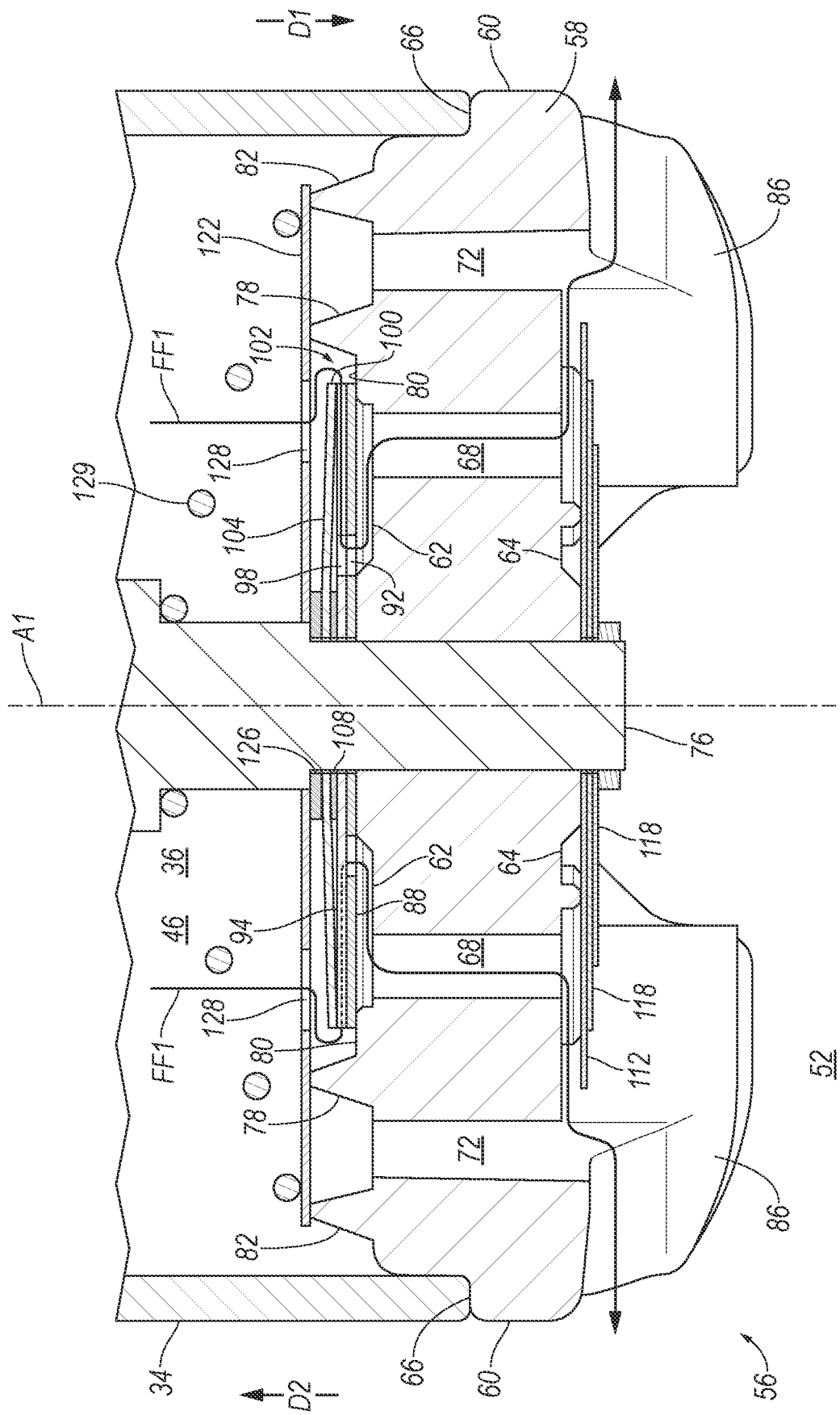
FIG. 10 is the cross section of FIG. 6 and illustrating the first fluid flow path when the damper assembly is moved toward the compressed position with the fluid flow rate and/or pressure differential above a first threshold.

Translating or flexing the check disc 104 may move the check disc 104 from a first position to a second position. The check disc 104 in the first position is spaced from orifice disc 94, e.g., as shown in FIGS. 6 and 8. The check disc 104 in the second position abuts the orifice disc 94, e.g., at the outer edge 100 and as shown in FIG. 10. The check disc 104 may flex at a fulcrum disc 108 of the cylinder end assembly 56 when moving from the first position to the second position.

The opening 102 between the check disc 104 and the seat disc 88 may be smaller in the first position than in the second position.

The amount of flex and/or translation of the check disc 104 (and the associated decrease in size of the opening) may be proportional to a rate of fluid flow and/or a pressure differential between the first chamber 36 and the second chamber 52. For example, the greater the rate of fluid flow and/or difference in fluid pressure, the greater the amount of flex and/or translation of the check disc 104. A threshold rate of fluid flow and/or difference in fluid pressure may be required to flex and/or translate the check disc 104. The check disc 104 may not increase resistance to movement until the threshold rate of fluid flow and/or difference in fluid pressure is achieved. The threshold rate of fluid flow and/or difference in fluid pressure may be determined based on desired response characteristics of the damper assembly 30.

The check disc 104 may be designed, e.g., via geometry such as thickness, material type, etc., to flex at the threshold rate of fluid flow and/or difference in fluid pressure. For example, increasing a thickness of the check disc 104 and/or selecting a stiffer material for the check disc 104 may increase the threshold rate of fluid flow and/or difference in fluid pressure required to decrease the size of the opening 102 between the check disc 104 and the seat disc 88. Decreasing the thickness of the check disc 104 and/or selecting a more flexible material for the check disc 104 may decrease the threshold rate of fluid flow and/or difference in fluid pressure required to decrease the size of the opening 102 between the check disc 104 and the seat disc 88.

The fulcrum disc 108 of the cylinder end assembly 56 is attached to the cylinder end 58, e.g., at the top surface 62. For example, the fastener 76 disposed in the center opening 74 of the cylinder end 58 may also be disposed in a center opening 110 of the fulcrum disc 108. The fulcrum disc 108 may be axially between the orifice disc 94 and the check disc 104. A thickness of the fulcrum disc 108 may define a distance of the spacing between the orifice disc 94 and the check disc 104 in the first position. The fulcrum disc 108 of the cylinder end assembly 56 provides a fulcrum point for the check disc 104, e.g., the check disc 104 may flex at an outer edge of the fulcrum disc 108 when moving from the first position to the second position.

The cylinder end assembly 56 may include a first valve disc 112. The first valve disc 112 may be attached to the cylinder end 58. For example, the fastener 76 disposed in the center opening 74 of the cylinder end 58 may also be disposed in a center opening 114 of the first valve disc 112. The first valve disc 112 may be at the bottom surface 64, e.g., the cylinder end 58 may be between the orifice disc 94 at the top surface 62 and the first valve disc 112 at the bottom surface 64.

The first valve disc 112 may selectively permit fluid flow through the second passages 70 in the first direction D1. The first valve disc 112 may inhibit fluid flow through the second passages 70 in a second direction D2 opposite the first direction D1, i.e., from the second chamber 52 to the first chamber 36. For example, the first valve disc 112 may decrease a resistance to movement in response to fluid flow past the first valve disc 112 and/or a difference in fluid pressure on one side of the first valve disc 112 relative to an opposite side. The fluid flow and/or difference in fluid pressure may translate or flex first valve disc 112 to create, and/or increase a size of, an opening 116 (illustrated in FIG. 12) between the bottom surface 64 of the cylinder end 58 (e.g., at the fourth rib 84) and the first valve disc 112 through which fluid may flow. Increasing the size of the opening 116 decreases resistance to movement by permitting a greater amount of fluid to flow from the first chamber 36 to the second chamber 52. The amount of flex and/or translation of the first valve disc 112, and the resulting increase in size of the opening 116, may be proportional to a rate of fluid flow and/or the pressure difference between the first chamber 36 and the second chamber 52. For example, the greater the rate of fluid flow and/or difference in fluid pressure, the greater the amount of flex and/or translation of the first valve disc 112 away from the bottom surface 64 of cylinder end 58, providing a greater magnitude of increase of the size the opening 116 therebetween. A threshold rate of fluid flow and/or difference in fluid pressure may be required to flex and/or translate the first valve disc 112. The first valve disc 112 may not decrease resistance to movement until the threshold rate of fluid flow and/or difference in fluid pressure is achieved.

Figure 7:
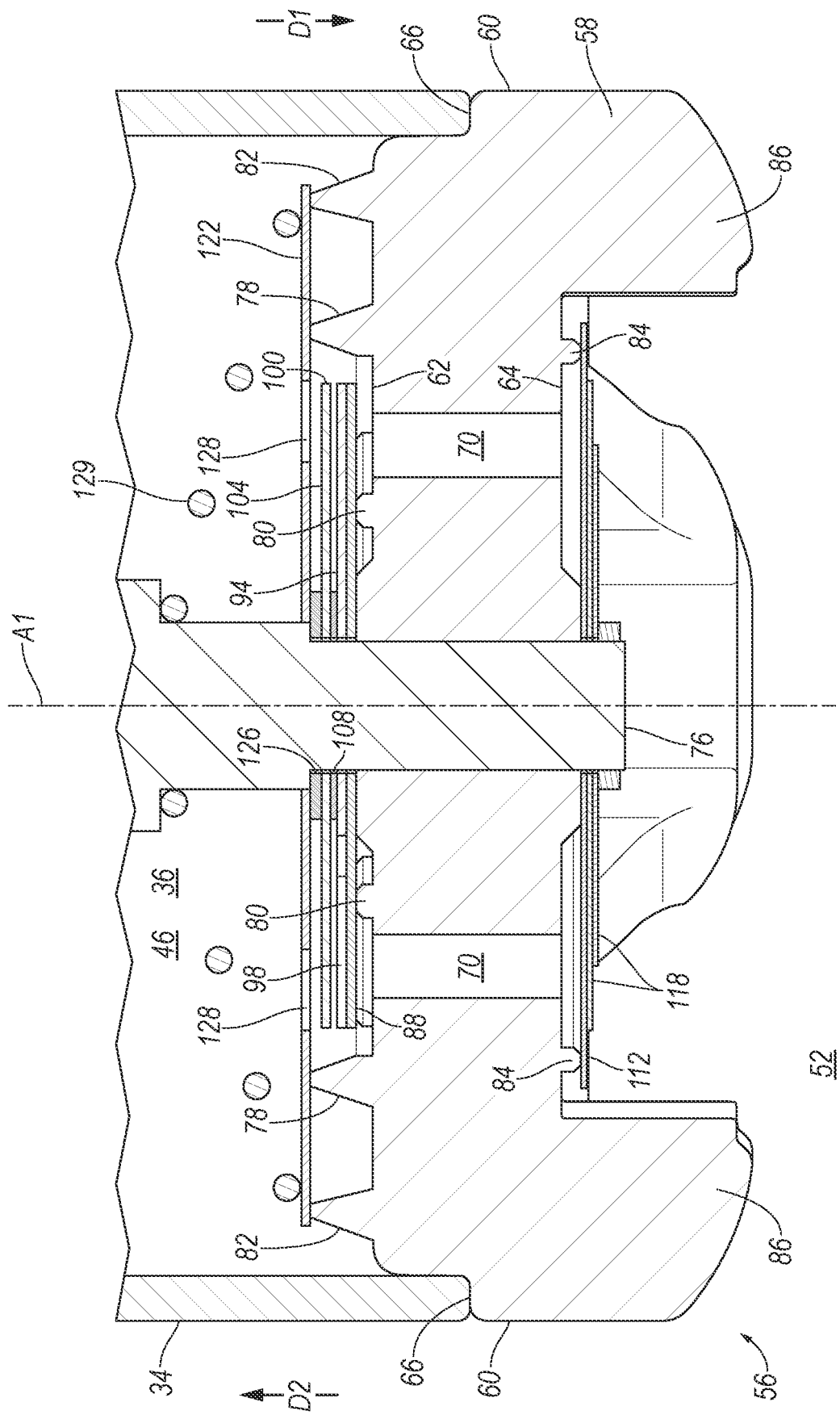
FIG. 7 is a cross-section of a portion of the damper assembly taken along line 7-7 of FIGS. 4 and 5.

When the damper assembly 30 is in a neutral state, i.e., not moving toward the extended position or the compressed position, the first valve disc 112 abuts the fourth rib 84 at the bottom surface 64 and covers the second passages 70 to inhibit fluid flow into, and out of, the second passages 70, as shown in FIG. 7.

Figure 12:
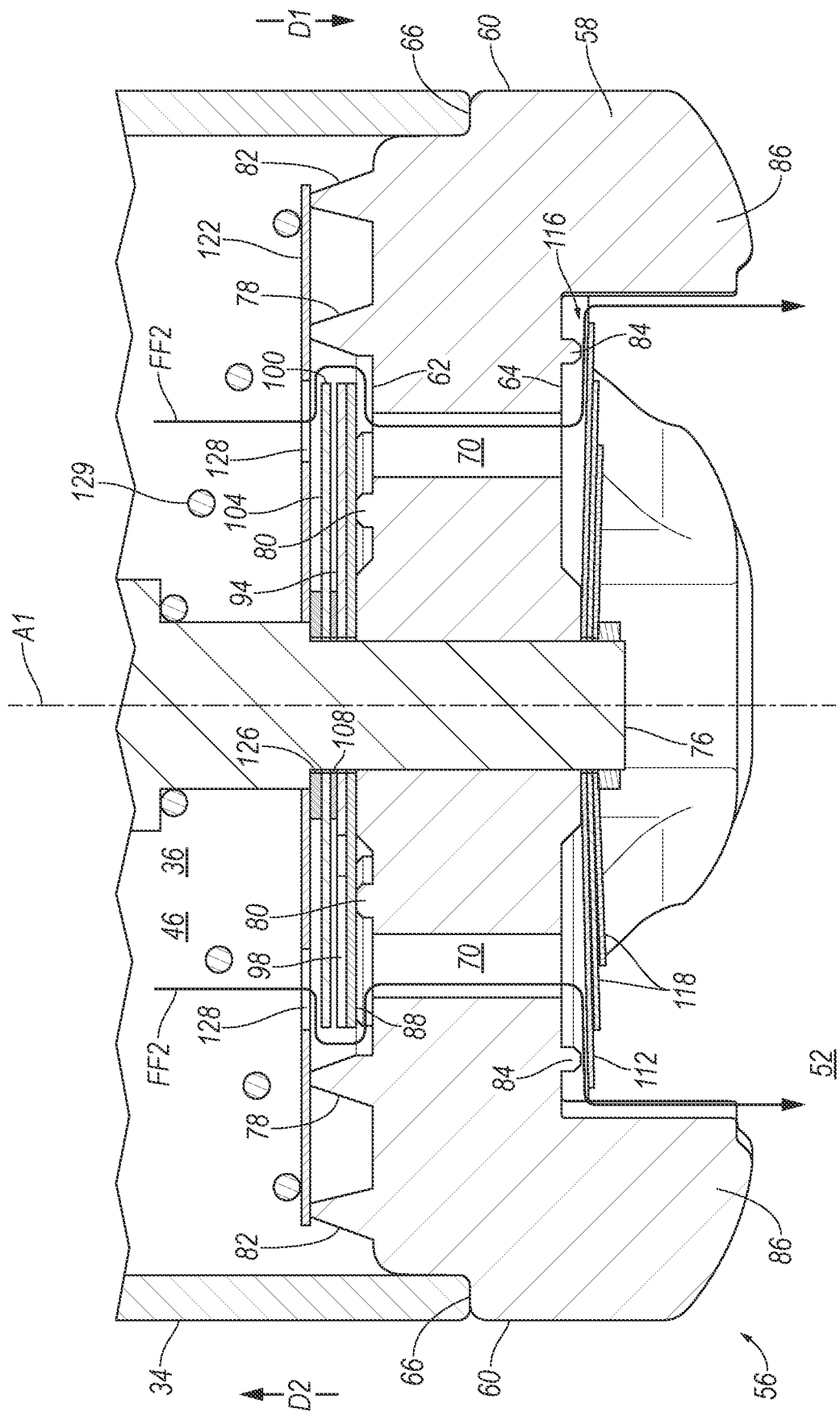
FIG. 12 is the cross section of FIG. 7 and illustrating a second fluid flow path when the damper assembly is moved toward the compressed position with the fluid flow rate and/or pressure differential above a second threshold.

When the damper assembly 30 is moved toward the extended position the first valve disc 112 may be moved away from the fourth rib 84 of the cylinder end 58 by the pressure differential and/or fluid flow resulting from such movement. Moving the first valve disc 112 away from the cylinder end 58 creates the opening 116 between the fourth rib 84 and the first valve disc 112. Fluid may flow out of the second passages 70 through the opening 116 to the second chamber 52, as shown in FIG. 12.

When the damper assembly 30 is moved toward the compressed position the first valve disc 112 at the bottom surface 64 may be urged toward the cylinder end 58, not creating or enlarging the opening 116 between the bottom surface 64 and the first valve disc 112.

With reference to FIGS. 6, 8, 10, and 14, the first valve disc 112 at the bottom surface 64 may be spaced from the bottom surface 64 at the first passages 68. Spacing the first valve disc 112 from the bottom surface 64 first at the first passages 68 permits fluid to freely flow into and out of the first passages 68 at the bottom surface 64, e.g., without inhibition of such flow by the first valve disc 112 at the bottom surface 64.

The cylinder end assembly 56 may include one or more spring discs 118. The spring discs 118 urge the first valve disc 112 toward the bottom surface 64 of the cylinder end 58, i.e., the spring discs 118 increase an amount of force required to flex the first valve disc 112 away from the bottom surface 64. The spring discs 118 may be attached to the cylinder end 58 at the bottom surface 64. For example, the fastener 76 disposed in the center opening 74 of the cylinder end 58 may also be disposed in center openings 120 of the spring discs 118.

The spring discs 118 are elastically deformable. For example, force applied to an outer edge of the spring discs 118 may cause the spring discs 118 to flex such that the outer edge is moved axially relative the center openings 120 of the spring discs 118. The spring discs 118 are made from an elastically deformable material, e.g., spring steel, plastic having suitable elastic properties, etc.

The spring discs 118 may progressively decrease in size as a function of the distance from the cylinder end 58 along the axis A1. For example, the spring disc 118 closest to the cylinder end 58 may have a larger outer diameter than an outer diameter of the spring disc 118 adjacent such spring disc 118 that is further from the cylinder end 58. As another example, the spring discs 118 may be configured similar to a leaf spring. The spring discs 118 closest the cylinder end 58 may abut the first valve disc 112

The merlons 86 may surround the first valve disc 112 and the spring discs 118. The merlons 86 may extend away from the bottom surface 64 and the first chamber 36 beyond the first valve disc 112 and the spring discs 118, e.g., protecting the first valve disc 112 and the spring discs 118.

The cylinder end assembly 56 may include a second valve disc 122. The second valve disc 122 may be attached to the cylinder end 58. For example, the fastener 76 disposed in the center opening 74 of the cylinder end 58 may also be disposed in a center opening 124 of the second valve disc 122. The second valve disc 122 may be at the top surface 62, e.g., abutting the first rib 78 and the second rib 80. The second valve disc 122 may be axially spaced from the check disc 104, e.g., with a second fulcrum disc 126 sandwiched therebetween.

The second valve disc 122 may define one or more openings 128. The openings 128 permit axial flow of fluid from one side of the second valve disc 122 to an opposite side of the seat disc 88. The openings 128 may be circumferentially elongated and spaced from each other about the axis A1. The openings 128 of the second valve disc 122 are in fluid communication with the first passages 68 of the cylinder end 58, i.e., such that fluid may flow from openings 128 of the second valve disc 122 to the first passages 68, and/or vice versa. For example, the openings 128 may be radially inward of the first rib 78, e.g., radially between the first rib 78 and the center opening 74 of the cylinder end 58.

The second valve disc 122 may selectively permit fluid flow through the third passages 72 in the second direction D2. The second valve disc 122 may inhibit fluid flow through the third passages 72 in the first direction D1. For example, the second valve disc 122 may decrease a resistance to movement in response to fluid flow past the second valve disc 122 and/or a difference in fluid pressure on one side of the second valve disc 122 relative to an opposite side. The fluid flow and/or difference in fluid pressure may translate or flex second valve disc 122 to create, and/or increase a size of, an opening 130 (illustrated in FIG. 14) between the top surface 62 of the cylinder end 58 (e.g., at the third rib 82) and the second valve disc 122 through which fluid may flow. Increasing the size of the opening 130 decreases resistance to movement by permitting a greater amount of fluid to flow from the second chamber 52 to the first chamber 36. The amount of flex and/or translation of the second valve disc 122, and the resulting increase in size of the opening 130, may be proportional to a rate of fluid flow and/or the pressure difference between the first chamber 36 and the second chamber 52. For example, the greater the rate of fluid flow and/or difference in fluid pressure, the greater the amount of flex and/or translation of the second valve disc 122 away from the top surface 62 of cylinder end 58, providing a greater magnitude of increase of the size the opening 130 therebetween. A threshold rate of fluid flow and/or difference in fluid pressure may be required to flex and/or translate the second valve disc 122. The second valve disc 122 may not decrease resistance to movement until the threshold rate of fluid flow and/or difference in fluid pressure is achieved.

The cylinder end assembly 56 may include a spring 129. The spring 129 urges the second valve disc 122 toward the cylinder end 58. The spring 129 may be, for example, a conical compression spring having one end with a smaller diameter than an opposite end having a larger diameter. The spring 129, e.g., the end with the larger diameter, may abut the second valve disc 122 opposite the cylinder end 58.

When the damper assembly 30 is in a neutral state, i.e., not moving toward the extended position or the compressed position, the second valve disc 122 abuts the first rib 78 and the third rib 82 at the top surface 62 and covers the third passages 72 to inhibit fluid flow into, and out of, the third passages 72. When the damper assembly 30 is moved toward the extended position the second valve disc 122 at the top surface 62 may be moved away from the fourth rib 84 of the cylinder end 58 by the pressure differential and/or fluid flow resulting from such movement. Moving the second valve disc 122 away from the cylinder end 58 creates the opening 130 between the third rib 82 and the second valve disc 122. Fluid may flow out of the third passages 72 through the opening 130 to the first chamber 36.

When the damper assembly 30 is moved toward the compressed position the second valve disc 122 at the top surface 62 may be urged toward the cylinder end 58, not creating or enlarging the opening 130 between the top surface 62 and the second valve disc 122.

With reference to FIGS. 8 and 10, a first fluid flow path FF1 defined by the cylinder end 58 are illustrated. The first fluid flow path FF1 is defined when the damper assembly 30 is moved toward the compressed position. The first fluid flow path FF1 extend from the compression sub-chamber 46 of the first chamber 36 through the openings 128 of the second valve disc 122, through the opening 102 between the check disc 104 and the seat disc 88, through the openings 92, 98 of the seat disc 88 and the orifice disc 94, and through the first passages 68 to the second chamber 52.

The first fluid flow path FF1 defines an area, e.g., perpendicular to the respective first fluid flow path FF1 through which fluid may flow. The defined area may be at narrowest portion of the respective first fluid flow path FF1. The defined area may include multiple areas. For example, the first fluid flow path FF1 may split into multiple sub-paths, e.g., with each sub-path extending through one of the first passages 68. The sub-paths may each have a sub-area at a narrowest portion of the respective sub-path, and the defined area of the respective first fluid flow path FF1 may be a combination of the areas of the sub-paths.

Figure 9:
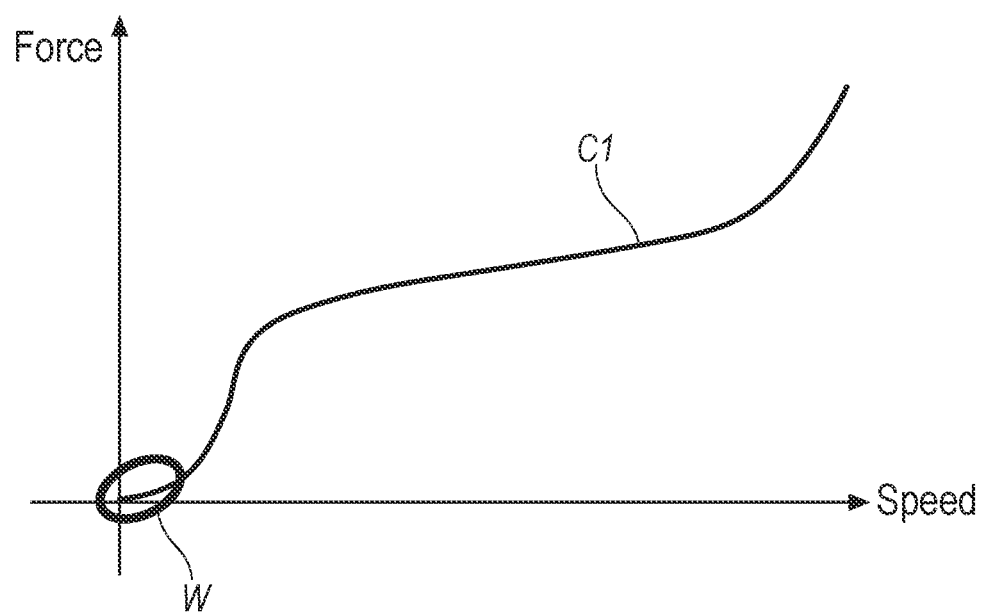
FIG. 9 is an illustration of a force response curve of the damper assembly moving toward the compressed position, the illustration identifying a first portion of the curve.

The first fluid flow path FF1, shown in FIG. 8, illustrates the damper assembly 30 moved toward the compressed position when movement of the piston 44 causes a fluid flow rate and/or a pressure differential between the compression sub-chamber 46 of the first chamber 36 and the second chamber 52 that is less than a first threshold, with the check disc 104 at the first position spaced from the orifice disc 94. When the fluid flow rate and/or pressure differential between the compression sub-chamber 46 of the first chamber 36 and the second chamber 52 is less than the first threshold, the areas defined by the first fluid flow path FF1 provide resistance to movement by limiting a rate at which fluid may flow though the first passages 68. Such resistance is illustrated in FIG. 9 by a section W of a speed-response force curve.

Figure 11:
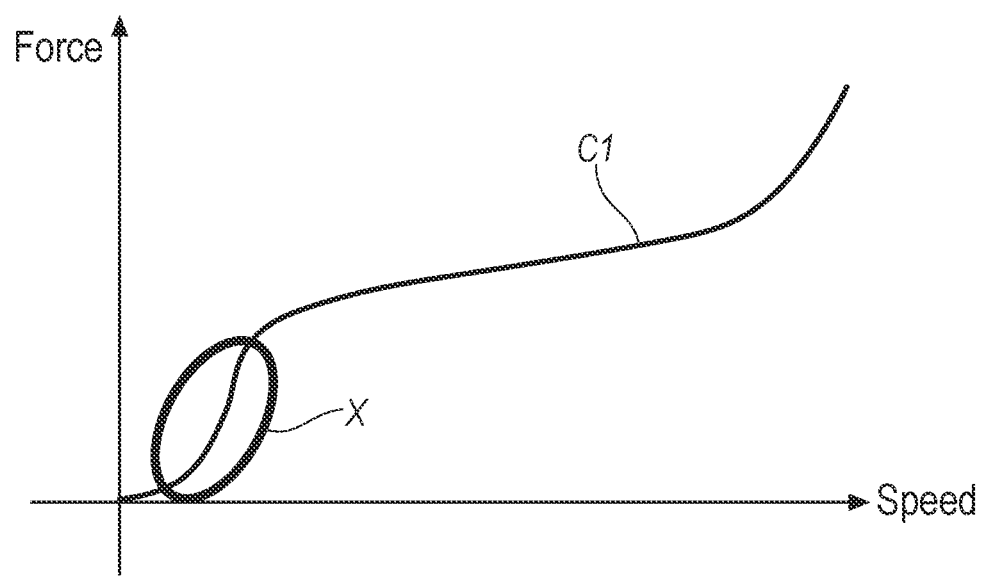
FIG. 11 is an illustration of the force response curve of the damper assembly moving toward the compressed position, the illustration identifying a second portion of the curve.

The first fluid flow path FF1 in FIG. 10 illustrates the damper assembly 30 moved toward the compressed position when movement of the piston 44 causes a fluid flow rate and/or a pressure differential between the compression sub-chamber 46 of the first chamber 36 and the second chamber 52 that is greater than the first threshold. When the fluid flow rate and/or the pressure differential are greater than the first threshold, the fluid flow along the first fluid flow path FF1 moves the check disc 104 to the second position abutting the orifice disc 94. The check disc 104 at the second position may minimize the size of the opening 102 between the check disc 104 and the seat disc 88, e.g., to be generally equal to the radial flow area of the openings 98 of the orifice disc 94. Decreasing and/or minimizing the size of the openings 102 decreases the defined area of the first fluid flow path FF1. The check disc 104 at the second position provides increased resistance to movement by further limiting the rate at which fluid may flow though the first passages 68. Such resistance is illustrated in FIG. 11 by a section Y of the speed-response force curve. The first threshold may be such that a magnitude of the speed-response force curve reaches a predetermined amount of response force within a predetermined amount of time. The predetermined amounts may be based on empirical testing, e.g., to optimize vehicle performance and/or occupant comfort.

With reference to FIG. 12, a second fluid flow path FF2 defined by the cylinder end assembly 56 is illustrated. The second fluid flow path FF2 is defined when the damper assembly 30 is moved toward the compressed position and movement of the piston 44 causes a fluid flow rate and/or the pressure differential between the compression sub-chamber 46 of the first chamber 36 and the second chamber 52 that is greater than a second threshold. The second threshold may be greater than the first threshold such that a slope and/or magnitude of the speed-response force curve does not exceed a predetermined amount. The predetermined amount may be based on empirical testing, e.g., to optimize vehicle performance and/or occupant comfort.

When the fluid flow rate and/or pressure differential is above the second threshold the first valve disc 112 and the spring discs 118 are urged away from the fourth rib 84 at the bottom surface 64 of the cylinder end 58, and the opening 116 therebetween is created. The second fluid flow path FF2 extends from the compression sub-chamber 46 of the first chamber 36 through the openings 128 of the second valve disc 122, around the check disc 104, the orifice disc 94 and the seat disc 88, through the second passages 70, and through the opening 116 between the first valve disc 112 and the cylinder end 58 to the second chamber 52. The second fluid flow path FF2 defines an area through which fluid may flow. The defined area of the second fluid flow path FF2 may include multiple sub-areas.

Figure 13:
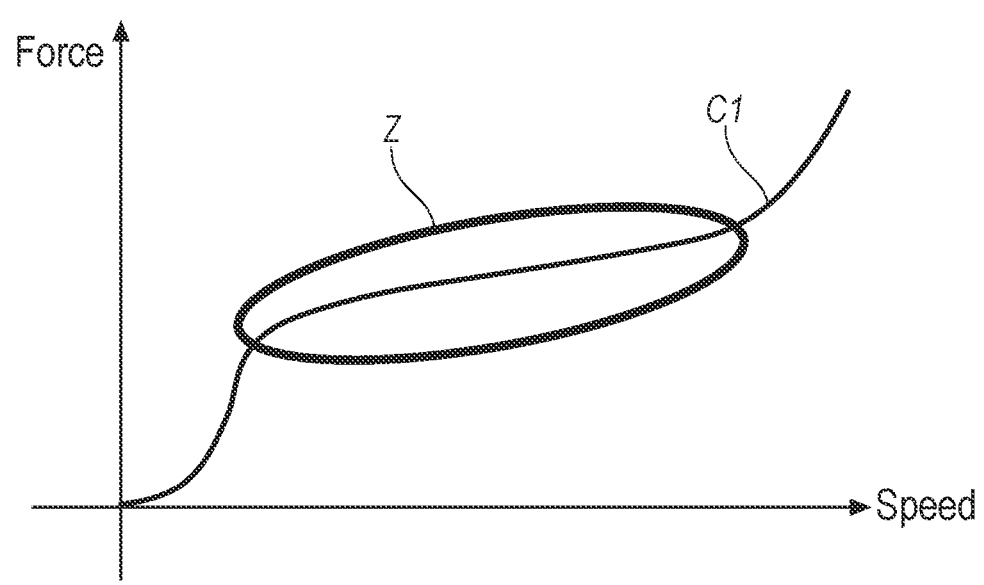
FIG. 13 is an illustration of a force response curve of the damper assembly moving toward the compressed position, the illustration identifying a third portion of the curve.

The combined defined areas of the first fluid flow path FF1 and the second fluid flow path FF2 reduce resistance to movement of the respective damper assembly 30 (relative to the defined area of just the first fluid flow path FF1) by increasing a rate at which fluid may flow from the compression sub-chamber 46 of the first passage to the second chamber 52. Such resistance is illustrated in FIG. 13 by a section Z of the speed-response force curve.

Figure 14:
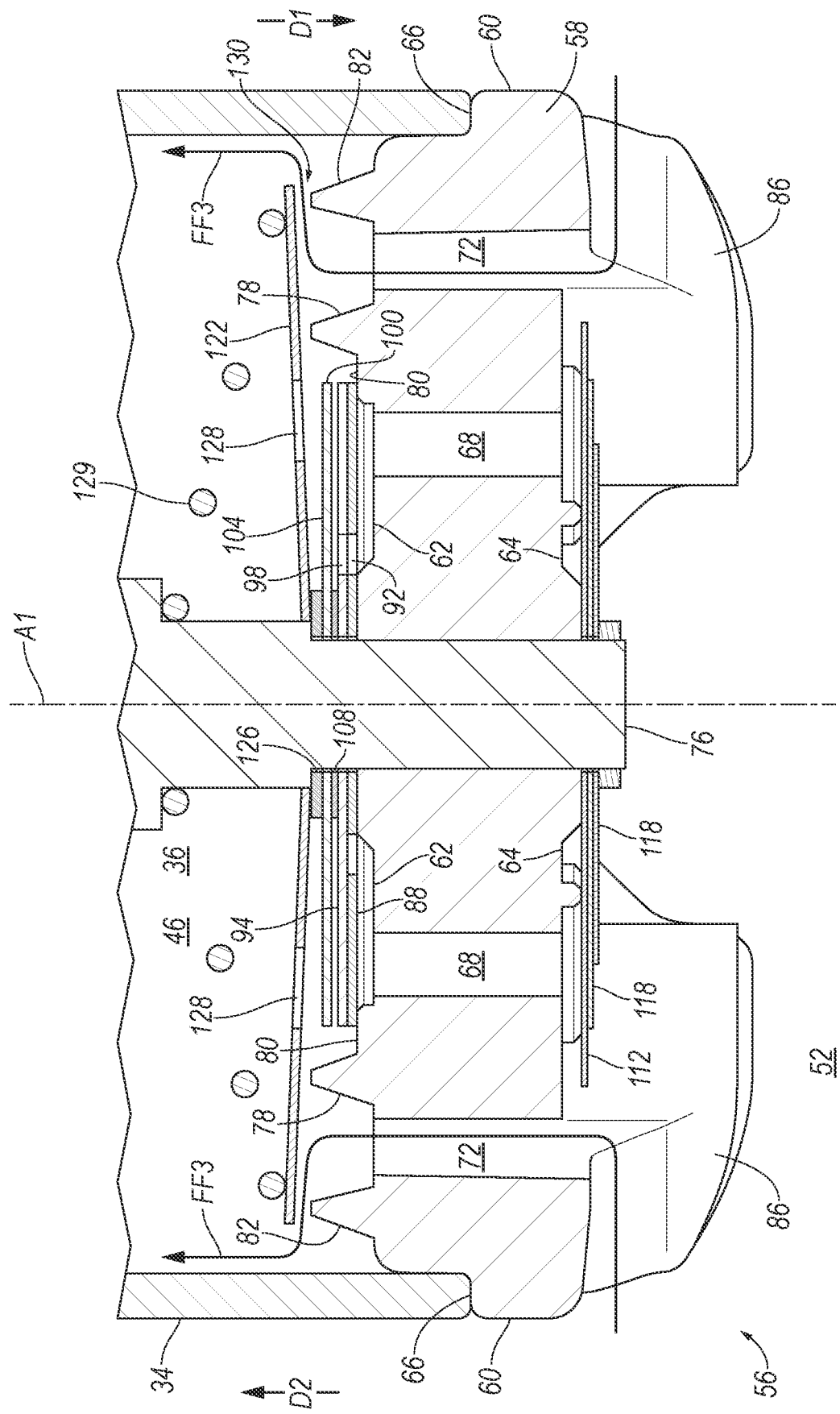
FIG. 14 is the cross section of FIG. 6 and illustrating a third fluid flow path when the damper assembly is moved toward an extended position with a fluid flow rate and/or pressure differential above a second threshold.

With reference to FIG. 14, a third fluid flow path FF3 defined by the cylinder end assembly 56 is illustrated. The third fluid flow path FF3 may be defined when the damper assembly 30 is moved toward the extended position and movement of the piston 44 causes a fluid flow rate and/or the pressure differential between the compression sub-chamber 46 of the first chamber 36 and the second chamber 52 that is above a third threshold. The third fluid flow FF3 path extends from the second chamber 52 through the third passages 72 and the openings 130 between the third rib 82 and the second valve disc 122 to the compression sub-chamber 46 of the first chamber 36. The third threshold may be such that a slope and/or magnitude of a speed-response force curve for does not exceed a predetermined amount. The predetermined amount may be based on empirical testing, e.g., to optimize vehicle performance and/or occupant comfort.

The adjectives "first," "second," etc., are used throughout this document as identifiers and are not intended to signify importance or order.

In the drawings, the same reference numbers indicate the same elements. Further, some or all of these elements could be changed.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A damper assembly, comprising:
a pressure tube defining a first chamber;
a piston movable within the pressure tube;
a reserve tube defining a second chamber;
a cylinder end attached to the pressure tube, the cylinder end defining a passage in fluid communication with the first chamber and the second chamber;
an orifice disc attached to the cylinder end and defining an opening in fluid communication with the passage, the opening of the orifice disc extending radially outward from the passage to an outer edge of the orifice disc; and
a check disc attached to the cylinder end, the check disc movable from a first position spaced from orifice disc toward the cylinder end to a second position abutting the orifice disc; and
wherein movement of the piston within the first chamber causes fluid flow between the first chamber and the second chamber via the passage of the cylinder end, and wherein the check disc and the orifice disc limit a rate of such fluid flow.

2. The damper assembly of claim 1, further comprising a fulcrum disc between the orifice disc and the check disc.

3. The damper assembly of claim 1, further comprising a seat disc between the orifice disc and the cylinder end, the seat disc defining an opening in fluid communication with the passage of the cylinder end and the opening of the orifice disc.

4. The damper assembly of claim 1, wherein the cylinder end defines a second passage in fluid communication with the first chamber and the second chamber, and further comprising a valve disc attached to the cylinder end, the valve disc selectively permitting fluid flow through the second passage in a first direction and inhibiting fluid flow through the second passage in a second direction opposite the first direction.

5. The damper assembly of claim 4, wherein the cylinder end is between the orifice disc and the valve disc.

6. The damper assembly of claim 4, wherein the cylinder end includes a rib extending away from a top surface of the cylinder end and surrounding the passage, the second passage, and the check disc.

7. The damper assembly of claim 6, wherein the cylinder end includes a second rib extending away from the top surface and surrounding the passage and not the second passage.

8. The damper assembly of claim 7, wherein the second rib is radially between the rib and the passage, and the second passage is radially between the rib and the second rib.

9. The damper assembly of claim 7, wherein the rib extends from the top surface beyond the second rib.

10. The damper assembly of claim 6, wherein the cylinder end includes a second rib extending away from the top surface and surrounding the rib, wherein the cylinder end defines a third passage radially between the rib and the second rib, the third passage in fluid communication with the first chamber and the second chamber, and further comprising a second valve disc attached to the cylinder end, the second valve disc selectively permitting fluid flow through the third passage in the second direction and inhibiting fluid flow through the third passage in the first direction.

11. The damper assembly of claim 10, wherein the second valve disc defines an opening radially inward of the rib.

12. The damper assembly of claim 10, wherein the second valve disc abuts the rib and the second rib.

13. The damper assembly of claim 1, wherein the check disc at the second position abuts the orifice disc at the outer edge.

14. A cylinder end assembly for a damper assembly, comprising:
- a cylinder end having a top surface opposite a bottom surface, the cylinder end defining a passage that extends from the top surface to the bottom surface;
- an orifice disc attached to the cylinder end and defining an opening in fluid communication with the passage, the opening of the orifice disc extending radially outward from the passage to an outer edge of the orifice disc; and
- a check disc attached to the cylinder end, the check disc movable from a first position spaced from orifice disc toward the cylinder end to a second position abutting the orifice disc; and
- wherein the check disc and the orifice disc limit a rate of fluid flow through the passage.

15. The cylinder end assembly of claim 14, further comprising a fulcrum disc between the orifice disc and the check disc.

16. The cylinder end assembly of claim 14, further comprising a seat disc between the orifice disc and the cylinder end, the seat disc defining an opening in fluid communication with the passage of the cylinder end and the opening of the orifice disc.

17. The cylinder end assembly of claim 14, wherein the cylinder end defines a second passage that extends from the top surface to the bottom surface, and further comprising a valve disc attached to the cylinder end, the valve disc selectively permitting fluid flow through the second passage in a first direction and inhibiting fluid flow through the second passage in a second direction opposite the first direction.

18. The cylinder end assembly of claim 14, wherein the check disc at the second position abuts the orifice disc at the outer edge.

\* \* \* \* \*